E. MOREAU & J. W. HAGGERTY.
Ammonia or Ether Machine.
No. 205,120. Patented June 18, 1878.
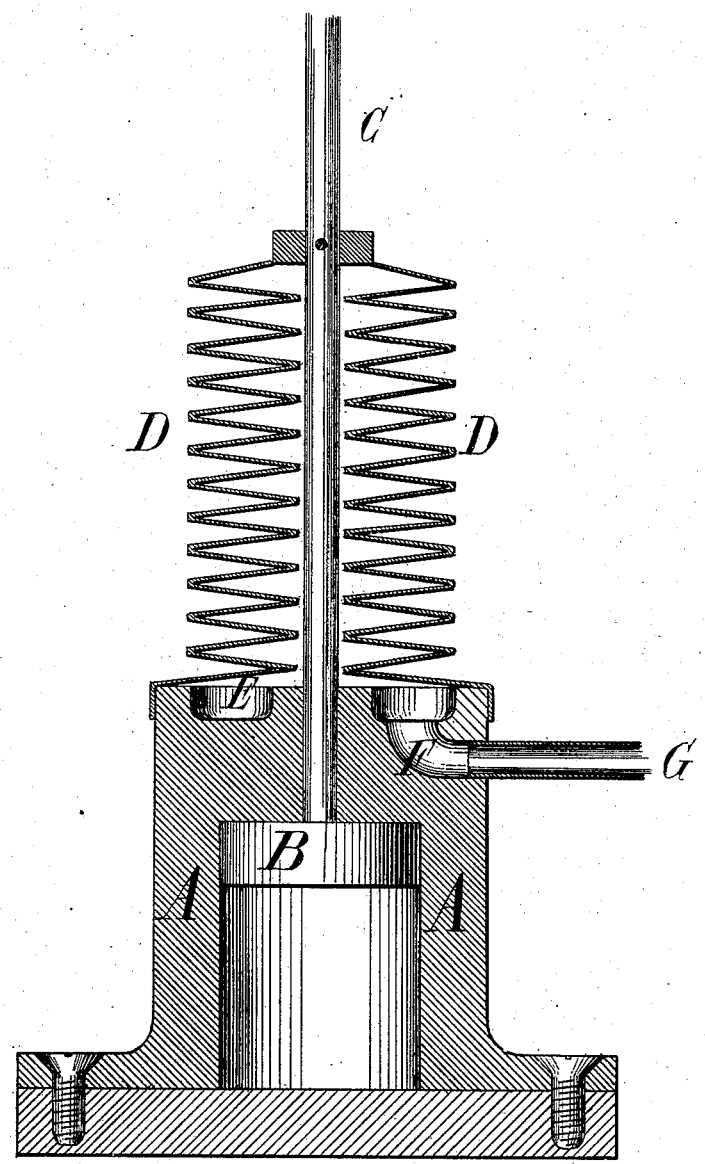

UNITED STATES PATENT OFFICE.

EUGÈNE MOREAU AND JAMES W. HAGGERTY, OF SAN FRANCISCO, CAL.

IMPROVEMENT IN AMMONIA OR ETHER MACHINES.

Specification forming part of Letters Patent No. 205,120, dated June 18, 1878; application filed November 6, 1877.

*To all whom it may concern:*

Be it known that we, EUGÈNE MOREAU and JAMES W. HAGGERTY, both of the city and county of San Francisco and State of California, have invented a new and useful Device to Prevent the Escape into the Surrounding Atmosphere of Vapors or Gases, especially in that class of machines known as "ether" or "ammonia" engines and pumps; and that the following is a clear and exact description of our invention, reference being had to the accompanying drawing, representing a vertical section of the cylinder of an engine fitted with our improvement.

In the said drawing, A is the cylinder. B is the piston. C is the piston-rod. D is a sort of bellows made of circular plates of metal or hard rubber, or other suitable material, connected in pairs alternately at the center and at the periphery, as shown in the drawing.

The upper plate of the bellows is fastened to the piston-rod C, and the lower plate to the cylinder-head A. These fastenings, as well as the bellows, must be made so as to be air-tight.

The rod C passes through the hole in the cylinder-head, and it may be provided there with a stuffing-box or a self-closing metallic packing.

E is a circular recess made into the top of the cylinder, and F is a channel leading from the recess E to the pipe G.

When the piston-rod moves up and down the bellows follows its motion by expanding and contracting, and any vapor leaking through between the rod and the cylinder-head cannot escape into the atmosphere, but is arrested by the bellows, and is led through the channel F and pipe G to a receptacle, such as a condenser, or other suitable place, where it is desirable to have it collected.

This mode of preventing the escape of gases or fluids can be applied to cylinder-heads, pump-rods, valve-rods, &c., and can thus divest the leakage of noxious or explosive vapors from its danger, and also prevent their waste.

Having thus described our invention, what we claim as new, and desire to secure by Letters Patent, is—

The combination of an expanding and contracting air-tight device, D, with the rod C, the cylinder A, or other device, through which the said rod may pass, and the outlet F G, as and for the purposes described.

EUGÈNE MOREAU.
J. W. HAGGERTY.

Witnesses:
GEO. W. DEITZLER,
H. B. MOORE.